(12) United States Patent
Aga et al.

(10) Patent No.: US 12,281,949 B2
(45) Date of Patent: Apr. 22, 2025

(54) MULTI-JUNCTION RESISTANCE STRAIN GAUGE DESIGN FOR ENHANCED GAUGE FACTOR

(71) Applicant: Government of the United States, as represented by the Secretary of the Air Force, Wright-Patterson AFB, OH (US)

(72) Inventors: Roberto Aga, Beavercreek, OH (US); Emily Heckman, Oakwood, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 302 days.

(21) Appl. No.: 17/822,866

(22) Filed: Aug. 29, 2022

(65) Prior Publication Data

US 2024/0068890 A1 Feb. 29, 2024

(51) Int. Cl.
*G01L 1/22* (2006.01)
(52) U.S. Cl.
CPC .................. *G01L 1/2287* (2013.01)
(58) Field of Classification Search
None
See application file for complete search history.

(56) References Cited

U.S. PATENT DOCUMENTS

| | | | |
|---|---|---|---|
| 10,770,206 B1 | 9/2020 | Aga et al. | |
| 2004/0159162 A1* | 8/2004 | Kieffer | G01L 1/2287 73/777 |
| 2006/0288794 A1* | 12/2006 | Hardwicke | G01L 1/2287 73/865.6 |
| 2007/0105395 A1* | 5/2007 | Kinzel | H05K 3/02 438/758 |
| 2018/0149531 A1* | 5/2018 | Atashbar | G01L 1/2287 |
| 2019/0022929 A1* | 1/2019 | Chaffins | H05K 1/16 |
| 2019/0152137 A1* | 5/2019 | Chaffins | B29C 64/153 |
| 2022/0146340 A1* | 5/2022 | Arias | A43B 17/00 |
| 2024/0261860 A1* | 8/2024 | Sander | B23K 26/342 |

* cited by examiner

*Primary Examiner* — Patrick Assouad
*Assistant Examiner* — Mark A Shabman
(74) *Attorney, Agent, or Firm* — AFMCLO/JAZ; Matthew D. Fair

(57) ABSTRACT

A multi-junction resistance strain gauge comprises a substrate; a sinterable ink deposited directly on the substrate forming a non-conductive pattern; a stripe pattern generated on the sinterable ink by sintering, the stripe pattern having one or more non-conductive gaps, the stripe pattern having a first electrical conductivity; a sintered bridge across each of the one or more gaps and providing electrical continuity through the stripe and across the gaps, each bridge having a second electrical conductivity which is lower than the first electrical conductivity. The substrate is a non-conductive material or a conductive material coated with a thin insulator on which the stripe pattern is generated. The sinterable ink is a silver ink. The first electrical conductivity and the second electrical conductivity comprise different electrical conductivity. The first electrical conductivity of the stripe is a factor of about 1.7 or more higher than the second electrical conductivity of the bridge.

11 Claims, 9 Drawing Sheets

Print a rectangular film using commercial silver ink on an insulating surface

Create a conducting stripe pattern on the film by selective laser sintering

Laser sinter a conductive bridge to electrically connect the conductive stripe pattern Remove non-laser sintered material Strain sensitive resistance junction is difficult to make with other methods such as depositing bridge over stripe Current will likely go around the resistance junction Desired Design Made Possible by Selective Laser Sintering

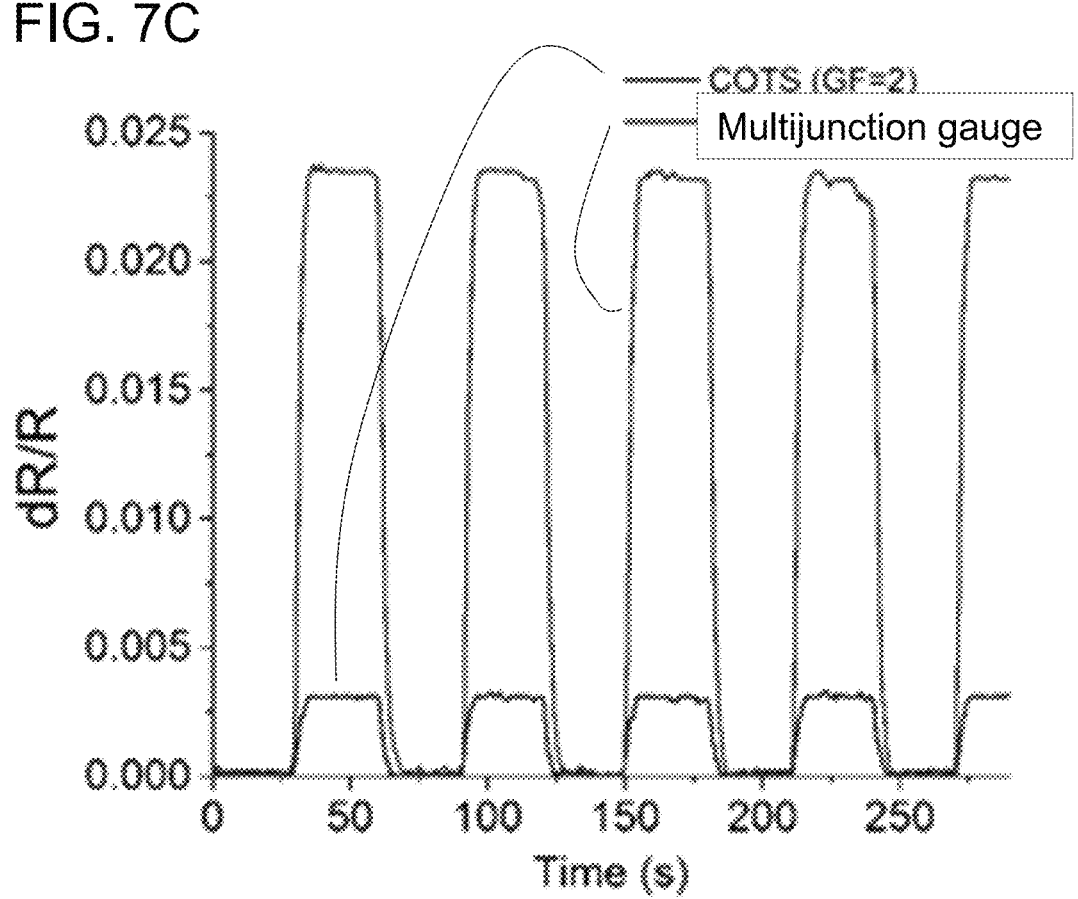

MULTI-JUNCTION RESISTANCE STRAIN GAUGE DESIGN FOR ENHANCED GAUGE FACTOR

RIGHTS OF THE GOVERNMENT

The invention described herein may be manufactured and used by or for the Government of the United States for all governmental purposes without the payment of any royalty.

FIELD OF THE INVENTION

The present invention relates generally to strain gauges and, more particularly, to multi-junction resistance strain gauges having enhanced gauge factor.

BACKGROUND OF THE INVENTION

The sensitivity of a strain gauge is measured by its gauge factor. For a resistance strain gauge with a serpentine pattern (the type that is commercially available), the gauge factor is limited by the inherent piezoresistance of the material. Piezoresistance is the ability of a conductive material to change its electrical conductivity when it is subjected to strain or stress. Electrical conductivity is a material property that determines electrical resistance. Typically, a higher gauge factor is desired as it is more sensitive and makes strain easier to measure (a higher gauge factor can eliminate the need for external electronics to measure the change in resistance, e.g. Wheatstone bridge). As depicted in FIG. 1A, the simplest resistance strain gauge is a dogbone pattern, which corresponds to the circuit model depicted in FIG. 1B. The serpentine pattern is basically two or more dogbone patterns connected in series.

The response of the dogbone resistance $R(\varepsilon)$ to strain F depends only on the inherent piezoresistance $R_{piezo}$ of the material and this is normally weak. Due to this weak piezoresistance, which translates to a low gauge factor, signal conditioning electronics is usually required by commercial resistance strain gauges (e.g. Wheatstone bridge).

What is desired is a strain gauge arrangement that overcomes the limitations of the inherent piezoresistance of the material.

SUMMARY OF THE INVENTION

The present invention overcomes the foregoing problems and other shortcomings, drawbacks, and challenges of prior art strain gauge arrangements. While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention a multi-junction resistance strain gauge comprises a substrate; a sinterable ink deposited directly on the substrate forming a non-conductive pattern; a stripe pattern generated on the deposited sinterable ink by sintering, the stripe pattern having one or more non-conductive gaps, the stripe pattern having a first electrical conductivity; and a sintered bridge across each of the one or more gaps and providing electrical continuity through the stripe and across the gaps, each bridge having a second electrical conductivity which is lower than the first electrical conductivity.

The substrate may be a non-conductive material or a conductive material coated with a thin insulator on which the stripe pattern is generated.

The sinterable ink may be a silver ink.

The first electrical conductivity and the second electrical conductivity comprise different electrical conductivity.

The first electrical conductivity of the stripe is a factor of about 1.7 or more higher than the second electrical conductivity of the bridge.

A method of manufacturing a multi-junction resistance strain gauge comprises providing a substrate; depositing a sinterable ink directly on the substrate to form a non-conductive pattern; generating a stripe pattern on the deposited sinterable ink by sintering, the stripe pattern having one or more non-conductive gaps, the stripe pattern having a first electrical conductivity; and sintering a bridge across each of the one or more gaps and providing electrical continuity through the stripe and across the gaps, each bridge having a second electrical conductivity which is lower than the first electrical conductivity.

Each of the features and elements may be assembled in any combination desired. Further, the transitional phrase "comprising" may be substituted for any of the prior-mentioned combinations with "consisting of" or "consisting essentially of" without limitation.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

FIGS. 7A-7C illustrate performance characteristics of a strain gauge made according to an embodiment of the invention.

Figure 1A:
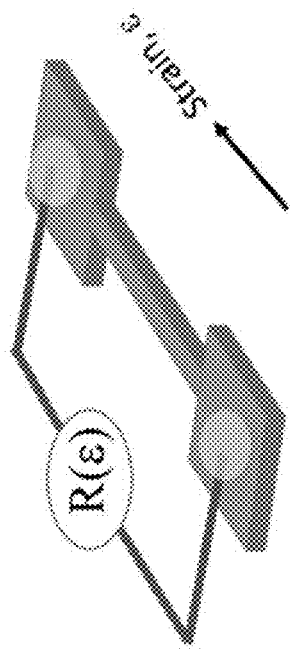
FIGS. 1A-1B depict prior art resistance strain gauge arrangements.
Figure 1B:
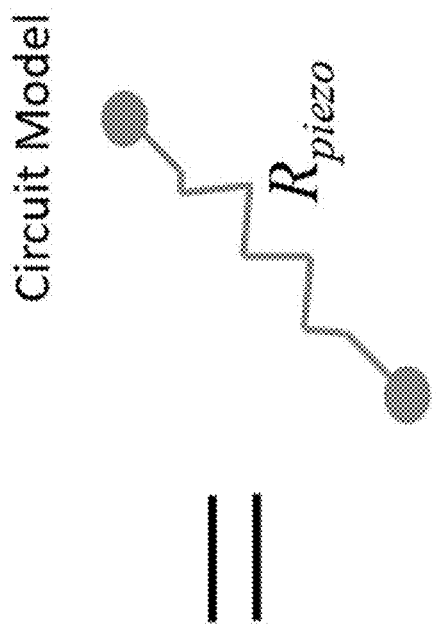

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

It was discovered that a "multi-junction pattern" (a term coined specifically for this application design) may be used to overcome the limitation on the gauge factor that is imposed by the inherent piezoresistance of the material.

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All documents mentioned herein are hereby incorporated by reference in their entirety. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein.

The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus and device may be used interchangeably in this text.

Features disclosed herein may be combined in any desired manner to achieve desired performance goals.

Figure 2A:
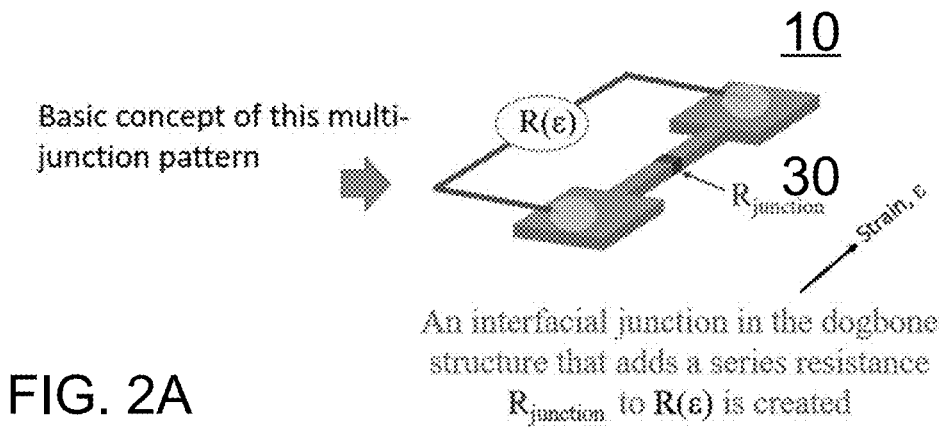
FIGS. 2A-2B illustrate a multijunction arrangement and equivalent circuit model of an embodiment of the invention.
Figure 2B:
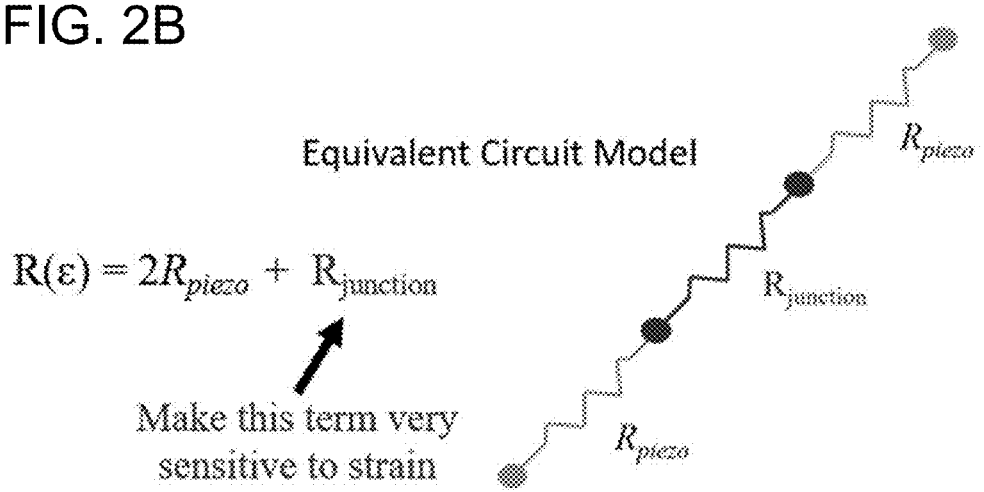

FIG. 2A illustrates the basic concept of the multi-junction strain gauge 10, with the equivalent circuit model presented in FIG. 2B. As presented in FIG. 2A, an interfacial junction 20 ($R_{junction}$) in the dogbone structure is created. This junction adds a series resistance labeled as $R_{junction}$ to $R(\varepsilon)$ so that the effective resistance of the dogbone pattern becomes $R(\varepsilon)=2R_{piezo}+R_{junction}$ as explained in FIG. 2B. If $R_{junction}$ is very sensitive to strain, the sensitivity of the effective resistance $R(\varepsilon)$ to strain may be enhanced due to the contribution of $R_{junction}$. With an appropriate fabrication technique, $R_{junction}$ may be made very sensitive to strain F, and this enhances the response $R(\varepsilon)$ and, consequently, the gauge factor. To maximize enhancement and sensitivity, a multi-junction arrangement may be used, as described below.

Figure 3A:
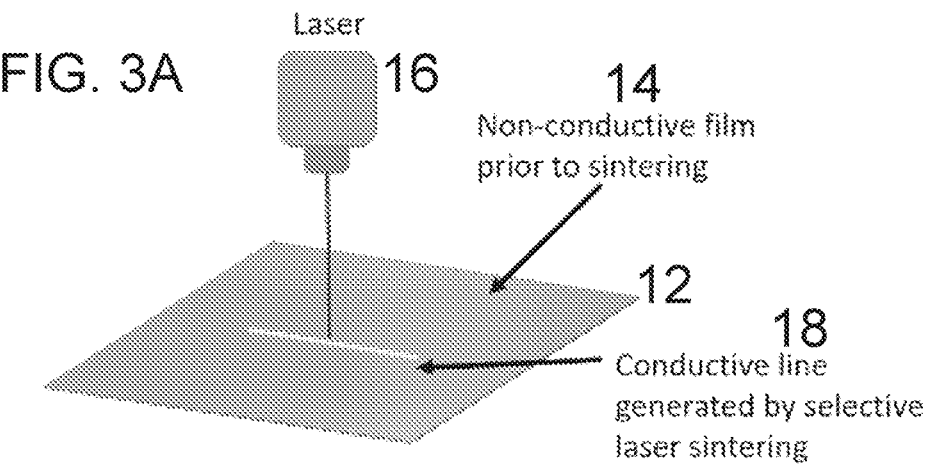
FIGS. 3A-3B illustrate an arrangement for sintering a conductive pattern, and a sample pattern according to an embodiment of the invention.
Figure 3B:
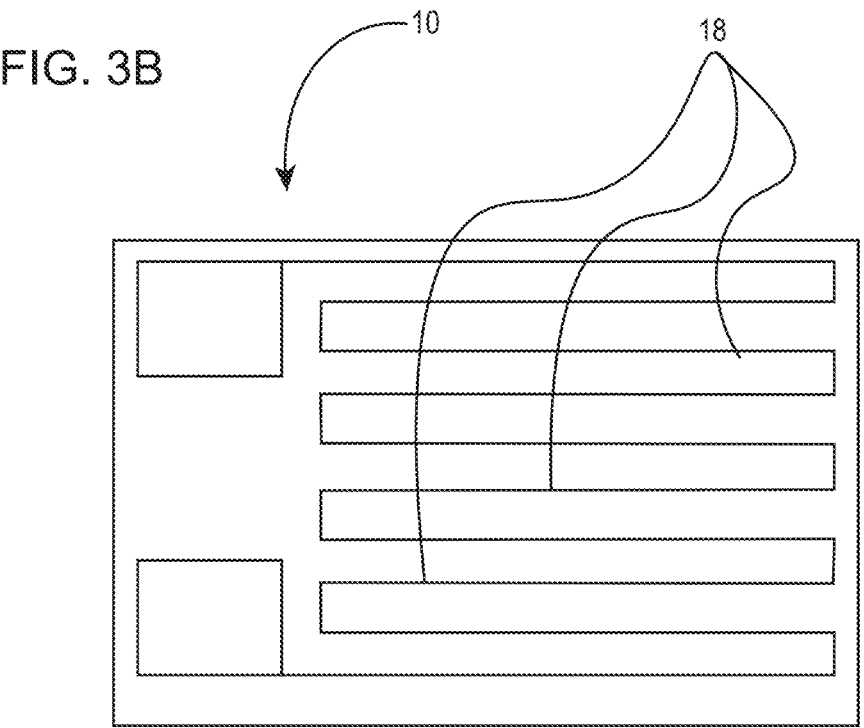

As illustrated in FIG. 3A, laser sintering may be employed to fabricate the inventive strain gauge arrangement. Selective laser sintering may generate an electrically conductive pattern 18 on a film coating 14 made of a printable ink that becomes electrically conductive when thermally sintered. In the laser sintering process, the laser 16 may be scanned in a controlled fashion to generate a complex functional conductive pattern, such as the serpentine pattern traditionally employed in resistance strain gauges as presented in FIG. 3B.

Figure 4A:
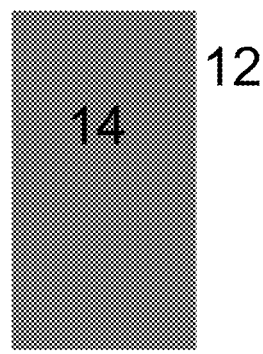
FIGS. 4A-4D illustrate a process for creating a functional multijunction resistance strain gauge, according to an embodiment of the invention.
Figure 4B:
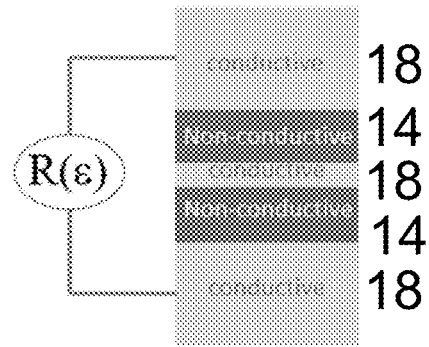
Figure 4C:
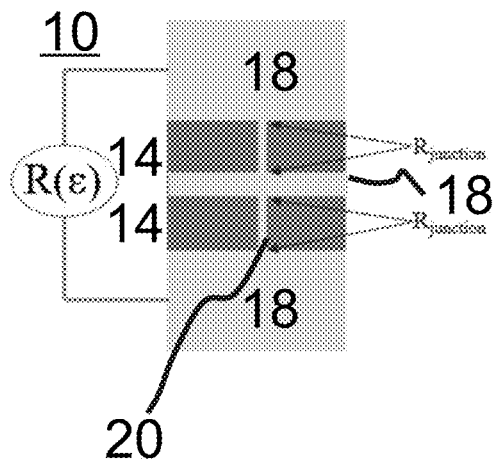
Figure 4D:
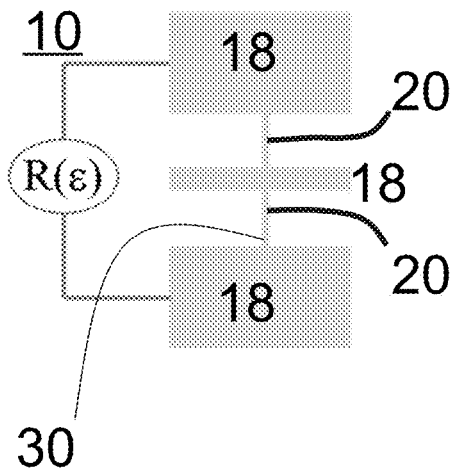

Selective Laser Sintering may be used to fabricate a multi-junction pattern with interfacial resistance junctions for enhancing gauge factor and therefore strain gauge performance. The first step in the process (FIG. 4A) is printing a film 14 of a silver ink on an insulating surface or substrate 12. The silver ink may be a commercially-available ink, such as the particle-free silver ink (product #EI-616) manufactured by Electroninks. Next, (FIG. 4B) creating a conducting stripe pattern 18 on the film 14 by selective laser sintering. Laser sintering creates conductive/non-conductive interfaces. It is noted that R(ε) is still infinite (open circuit) after this step because the stripe patterns 18 are separated by the non-laser sintered material. As the third step (FIG. 4C), laser sintering a conductive bridge 20 to electrically connect the conductive stripe patterns created in the second step. The two outermost stripe patterns 18, which are wider than the middle stripe pattern, serve as the contact pads for wiring the strain gauge to be able to connect to electronic readout. It is not required for the contact pads to be wider, but wider pads are more convenient for wiring the strain gauge. With the appropriate laser sintering conditions, the interfacial junctions 30 are created between the stripe pattern 18 and the conductive bridge 20. Accordingly, there are four interfacial junctions 30 present in FIGS. 4C and 4D. The resulting $R_{junction}$ is very sensitive to strain. The fourth step (FIG. 4D), which is the removal of the non-laser sintered material 14, may or may not be required depending on the particular silver ink used. For silver inks that exhibit self-curing behavior with time, this fourth step is required. An example of such ink is the EI-616 that is used here. The non-laser sintered EI-616 material may be removed by a solvent wash-off using 1-dodecene. The resulting strain gauge may be passivated with flexible sealants such as the. UV-curable dielectric commercially sold as NEA-121.

The novelty and uniqueness of this invention lies in the design and stripe pattern of the gauge. Laser sintering is one method that has been found to easily and directly enable the fabrication of this device. However, other fabrication methods may be employed to create the multi-junction resistance bands that make this strain gauge so sensitive.

It has been discovered that the electrical conductivity of the stripes and the conductive bridge must be different, and this difference in conductivity creates the resistance junction effect and the enhanced sensitivity to strain. It has been observed that when the conductivity of the stripe is roughly a factor of about 1.7 or more higher than the bridge, enhanced sensitivity is achieved. The difference may be accomplished by varying the optical energy per unit area applied to the stripes and the bridge. The optical energy ratio applied to the stripe and to the bridge should at least 1.75. For example, if about 7 Joules/mm$^2$ of energy is applied to the stripe, then about 4 Joules/mm$^2$ should be applied to the bridge. Higher applied energy yields lower resistance and vice versa. There are two ways to control the energy applied to the materials being laser sintered. The first one is to control the laser power while the laser scan speed is kept constant. Increasing the laser power increases the energy applied to the material. This is the method that has been employed here to create the conductivity difference between the stripe and bridge. At a constant laser scan speed of about 5 mm/s, 3-15 mm/s is acceptable, the power applied to the stripe and the bridge are about 70 mW and about 40 mW, respectively. An acceptable range is between about 40 mW and 100 mW. The second way to control applied energy is to vary the laser scan speed while the laser power is kept constant. Increasing the scan speed decreases the applied energy (effectively) and vice versa. While the above description applies to the laser sintering approach to manufacturing this multi-junction strain gauge, the ~1.7 difference in resistivity may be achieved through other various fabrication techniques. For example, the stripes may be fabricated with one type of metal and the bridge with a different metal using a combination of metal evaporation and photolithography.

From the fabrication standpoint, the resistance junction effect may only be realized if the stripes are designed to have higher electrical conductivity than the bridge, as described above. Enhanced sensitivity due to this resistance junction effect has been observed when conductivity of stripe is roughly a factor of 1.7 higher than the bridge. If it is the other way around, the bridge will have to be sintered using the conditions for higher applied energy (higher power setting or lower scan speed). This will re-sinter the stripes if they have been created prior to the bridge, and this can make the conductivity of the stripes and the bridge the same because the stripes are not yet optimally sintered (the reason why they have lower conductivity). If the bridge has been created first, the sintering conditions to create stripes with lower conductivity would have an insignificant effect on the existing bridge because it is already optimally sintered. Thus, resistance junctions will not be created at the overlap between the bridge and the stripes.

Figure 5B:
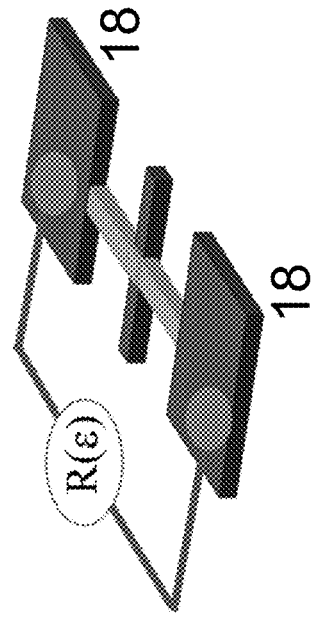
FIGS. 5A-5C illustrate functional aspects of a multijunction strain gauge according to an embodiment of the invention.
Figure 5C:
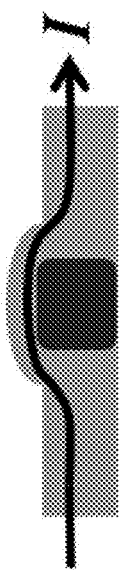
Figure 5A:
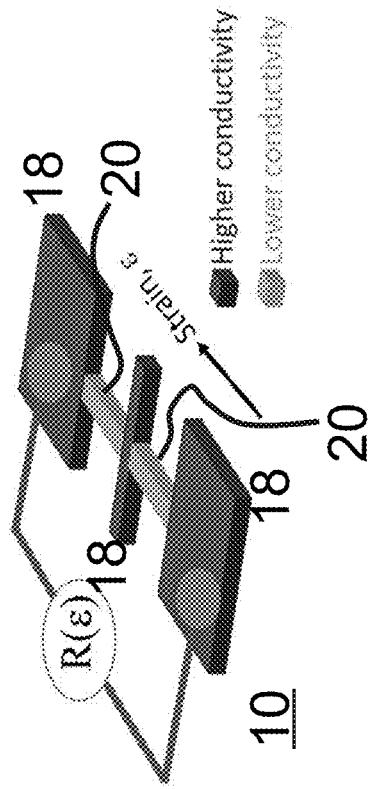

As an alternative approach, after creating the conductive stripes by selective laser sintering, the non-laser sintered parts of the film may be removed with solvents such as 1-dodecene or by laser cutting. The choice of solvents to remove the unsintered material is completely dependent on the original material selected for use and must be adjusted for each new material. One can thus deposit a conductive bridge 20 using a material with a different conductivity to create resistance junctions 30 with the stripes 18 (see FIG. 5A). Aside from being a longer fabrication process, depositing a conductive bridge over the stripes (see FIG. 5B) does not guarantee a resistance junction that is sensitive to strain. This is because the bridge material will likely form a continuous electrical line over the stripe; the electrical current will flow over the stripe (through the overlaying bridge material—see FIG. 5C) rather than crossing the bridge-stripe junction. It may be possible to remove the bridge material on top of the stripe or prevent the bridge material from depositing on the stripe but these steps are not trivial. To be clear, FIGS. 5B and 5C illustrate an undesired arrangement.

Figure 6A:
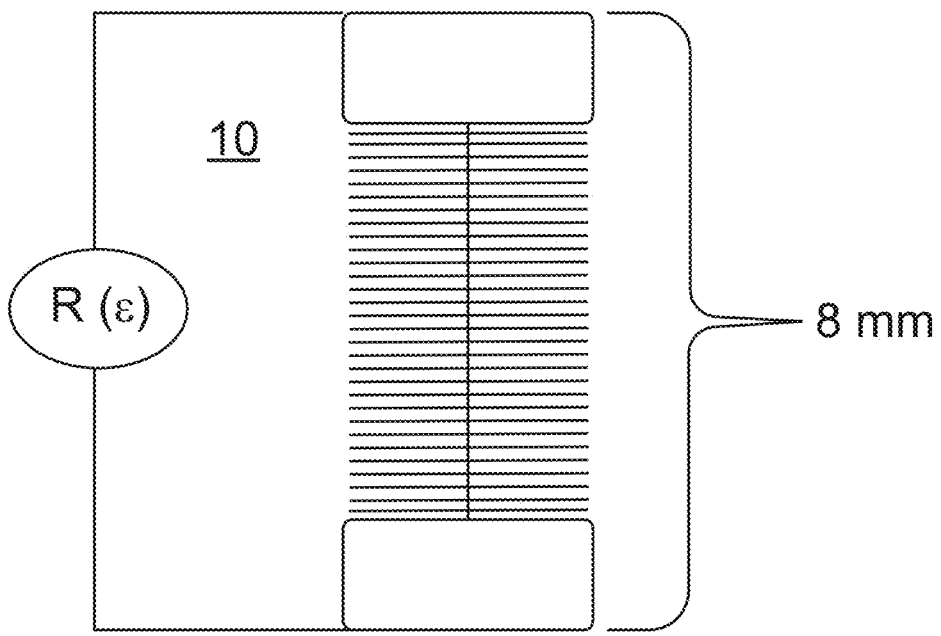
FIGS. 6A-6B illustrate a functional strain gauge made according to an embodiment of the invention.

The number of junctions may be varied to control resistance and to tailor the gauge factor. FIG. 6A presents an exemplary resistance strain gauge with multiple conductive stripes perpendicular to the less conductive bridge. This creates a multi-junction pattern for enhanced gauge factor. In one example, a commercial silver ink (e.g. Electroninks-616) may be used. The ink may be applied on a cantilever made of a printed circuit board (PCB) with Cu cladding. A UV curable dielectric (e.g. NEA-121) may be used as an interlayer to isolate the strain gauge from the Cu cladding.

Figure 6B:
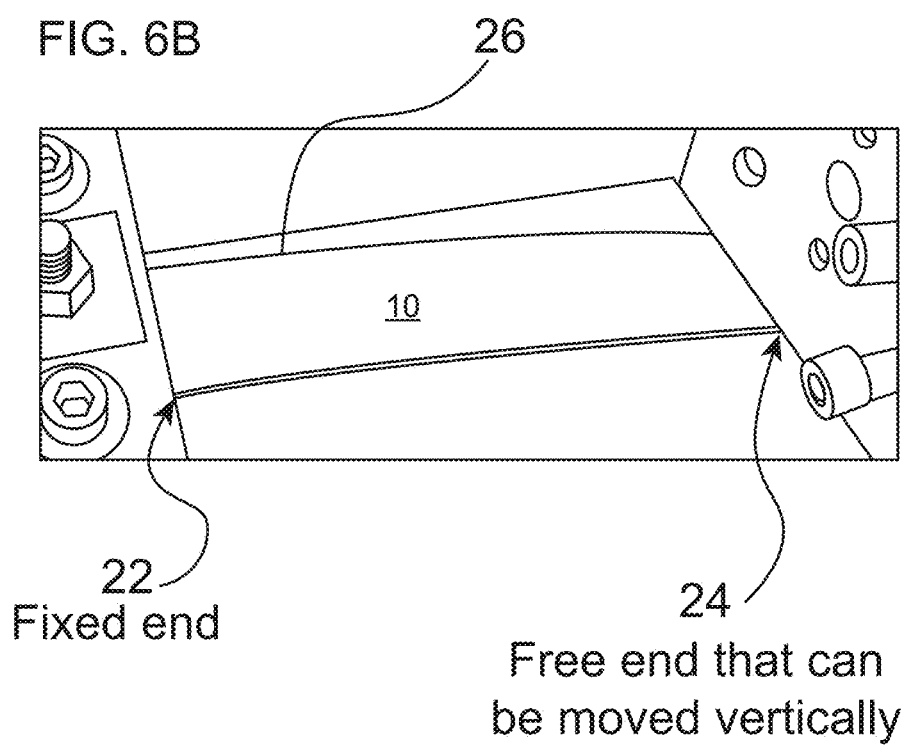

FIG. 6B depicts a cantilever 26 having a strain gauge 10 that is directly fabricated according to the disclosed method. To apply strain to the gauge, one end of the cantilever 26 is fixed 22 while the free end 24 is moved perpendicular to the plane of the cantilever, typically vertically or horizontally. The displacement or deflection of the free end bends the gauge and this applies strain that changes its electrical resistance. The longer the displacement, the more bending of the cantilever and the higher the strain on the gauge. Thus, different levels of strain may be applied by controlling the displacement of the free end with respect to the position of the fixed end. The gauge factor is extracted from the relationship between the change in electrical resistance as a function of applied strain. In order to ensure that the displacement is correctly converted to a strain applied to the gauge, a commercial off-the shelf (COTS) strain gauge with known gauge factor was mounted and tested on the cantilever as depicted in FIG. 6B. Since the gauge factor is known, the strain can be calculated from the change in resistance of the gauge. Thus, a relationship between the strain as a function of displacement can be established.

Figure 7A:
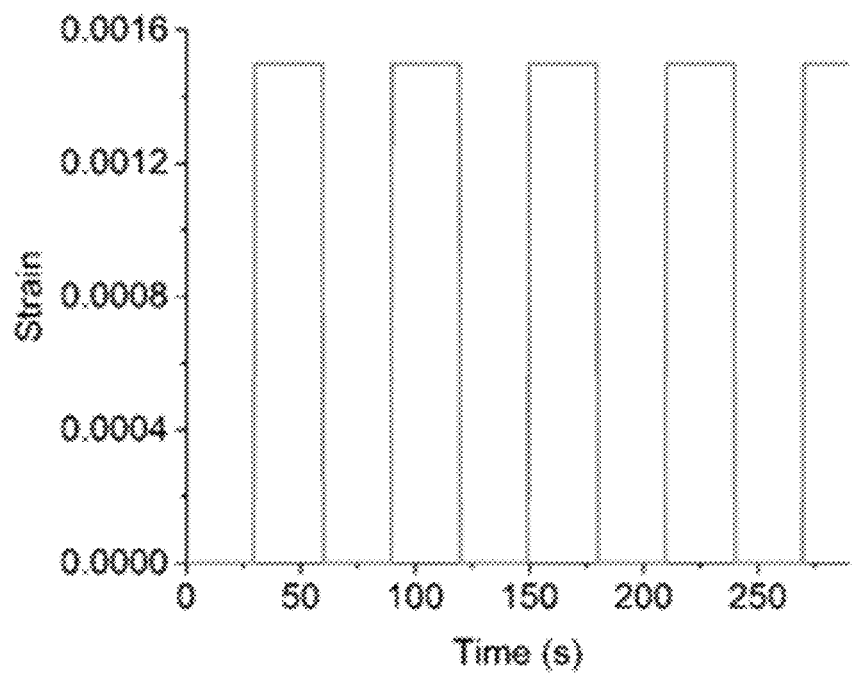
Figure 7B:
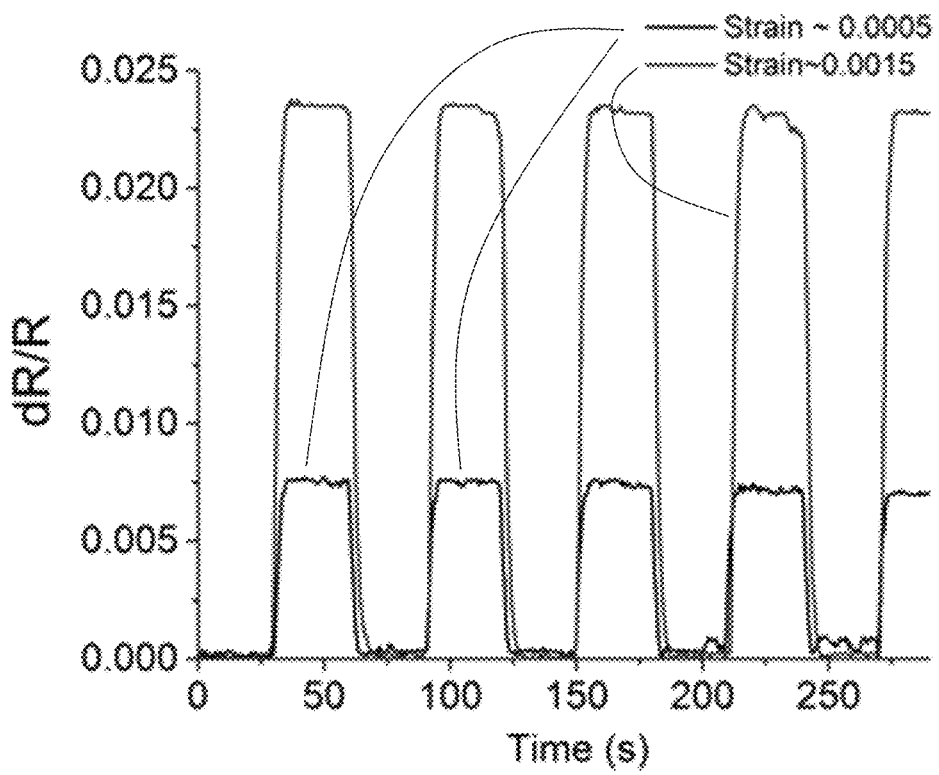

FIGS. 7A-7C present the results of cyclic bending of a strain gauge fabricated according to the method described above. FIG. 7A depicts a plot of the pulsed strain applied to the cantilever vs time. The cantilever is bent back and forth at a constant displacement to generate this pulsed strain. FIG. 7B depicts the response of the strain gauge to two levels of strain. It should be noted that 'strain' is a unitless quantity. It corresponds to the ratio of the change in length over the original length; the units cancel out. The lower plot corresponds to an applied strain of 0.0005, and the upper plot corresponds to an applied strain of 0.0015. Plotted response is dR/R where dR is the change in resistance and R is the unstrained resistance. Gauge Factor, which is dR/R divided by the applied strain, is demonstrated to be stable with time. Unstrained resistance does not drift with time. FIG. 7C depicts the response of the inventive strain gauge (upper plot) as compared to a COTS strain gauge (lower plot) at the same strain level. Gauge Factor of COTS strain gauge is 2, while the measured gauge factor of the invented strain gauge is 15.

Figure 8B:
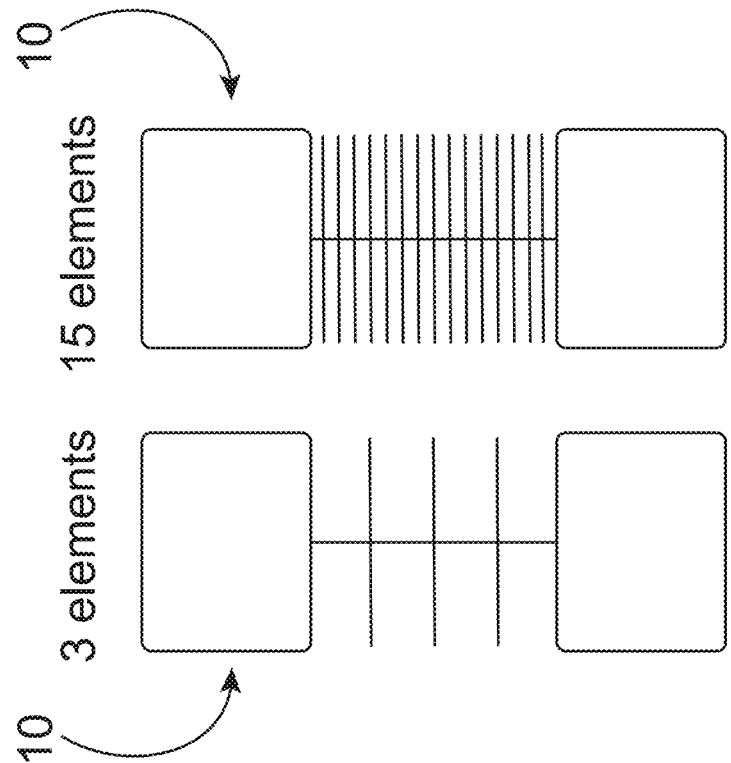
FIGS. 8A-8B illustrate strain gauge embodiments having different numbers of elements.
Figure 8A:
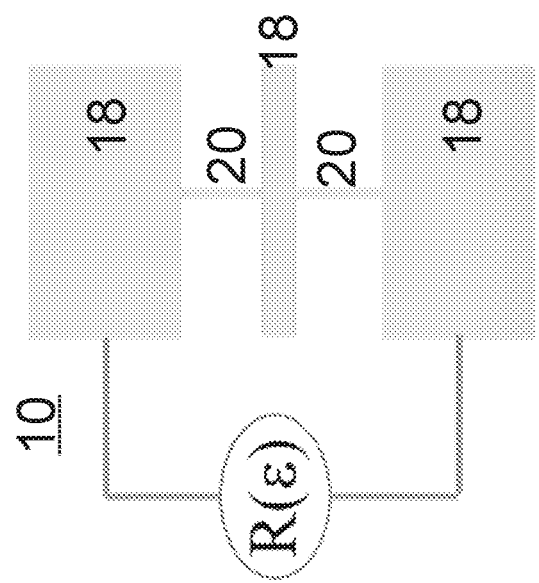

FIG. 8A-8B present the inventive strain gauges 10 having different numbers of conductive stripes 18. FIG. 8A is a diagram representing a strain gauge 10 having only a single conductive stripe between the two stripes 18. FIG. 8B presents a photograph of actual strain gauges 10 having 3 and 15 conductive stripes, respectively. In FIG. 8B, the three-conductive stripe strain gauge (on left) has a gauge factor of 13. The 15 conductive stripe strain gauge (on right) has a gauge factor of 17. In general, the greater number of conductive stripes the higher the gauge factor, but there may be an optimum number of stripes that yields the highest gauge factor. The gauge factor for the 3-stripe and 15-stripe gauges were compared by testing them side by side on the same cantilever with equal applied strain.

The initial "non conductive" material may be chosen from a variety of commercially available inks used for printed electronics applications. In this case, these inks are designed to be conductive, but become conductive only after they are sintered. Examples include commercially available silver inks, gold inks, graphene, composite materials, etc. such as a particle-free silver ink commercially available from Electroninks.

The term "sintering" refers to a process to make the ink conductive after it has been printed. Sintering may be accomplished in many ways, e.g. in an oven using temperature to bake, using a laser to selectively heat the material, photonically using different light sources such as UV. The method of sintering chosen for most printed electronics applications is dependent upon the application and the ink material being printed.

The material, or ink, may be deposited in many different ways: spin coating, inkjet printing, aerosol jet printing, spray coating, screen printing, drop casting, etc. The method one chooses to deposit the ink material may depend on the material properties of the ink (viscosity, particle size) and the needs of the application—how uniform the coating needs to be and how accurately it needs to be deposited.

In one embodiment, aerosol jet printing may be used to deposit a commercially available silver ink, and laser sintering to make it selectively conductive.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A multi-junction resistance strain gauge, comprising:
   a substrate;
   a sinterable ink deposited directly on the substrate forming a non-conductive pattern;
   a stripe pattern generated on the deposited sinterable ink by sintering, the stripe pattern having one or more non-conductive gaps, the stripe pattern having a first electrical conductivity; and
   a sintered bridge across each of the one or more gaps and providing electrical continuity through the stripe and across the gaps, each bridge having a second electrical conductivity which is lower than the first electrical conductivity.

2. The multi-junction resistance strain gauge of claim 1, wherein the substrate is a non-conductive material or a conductive material coated with a thin insulator on which the stripe pattern is generated.

3. The multi-junction resistance strain gauge of claim 1, wherein the sinterable ink is a silver ink.

4. The multi-junction resistance strain gauge of claim 1, wherein the first electrical conductivity of the stripe is a factor of about 1.7 or more higher than the second electrical conductivity of the bridge.

5. A method of manufacturing a multi-junction resistance strain gauge, comprising:
   providing a substrate;
   depositing a sinterable ink directly on the substrate to form a non-conductive pattern;
   generating a stripe pattern on the deposited sinterable ink by sintering, the stripe pattern having one or more non-conductive gaps, the stripe pattern having a first electrical conductivity; and
   sintering a bridge across each of the one or more gaps and providing electrical continuity through the stripe and across the gaps, each bridge having a second electrical conductivity which is lower than the first electrical conductivity.

6. The method of claim 5, wherein the substrate is a non-conductive material or a conductive material coated with a thin insulator on which the stripe pattern is generated.

7. The method of claim 5, wherein the sinterable ink is a silver ink.

8. The method of claim 5, wherein the first electrical conductivity of the stripe is a factor of about 1.7 or more higher than the second electrical conductivity of the bridge.

9. An Apparatus for constructing a multi-junction resistance strain gauge system, comprising:
   a substrate;
   a sinterable ink deposited directly on the substrate forming a non-conductive pattern;
   a stripe pattern generated on the deposited sinterable ink by sintering, the stripe pattern having one or more non-conductive gaps, the stripe pattern having a first electrical conductivity;
   a sintered bridge across each of the one or more gaps and providing electrical continuity through the stripe and across the gaps, each bridge having a second electrical conductivity which is different than the first electrical conductivity; and
   first and second contact pads formed on opposing ends of the substrate.

10. The apparatus of claim 9 further comprising wiring connected to each contact pad.

11. The apparatus of claim 9 further comprising an electronic system connected to the wiring to measure a change in electrical conductivity of the strain gauge and provide strain readouts during a specimen test.

* * * * *